United States Patent [19]

Chen

[11] Patent Number: 5,562,185
[45] Date of Patent: Oct. 8, 1996

[54] BRAKE MECHANISM FOR BICYCLE

[76] Inventor: Zen-Ming Chen, P.O. Box 63-69, Taichung, Taiwan

[21] Appl. No.: 613,019

[22] Filed: Mar. 11, 1996

[51] Int. Cl.⁶ .................................................. B62L 3/00
[52] U.S. Cl. .................................... 188/24.12; 188/24.22
[58] Field of Search ........................... 188/24.12, 24.16, 188/24.19, 24.21, 24.22, 73.1

[56] References Cited

U.S. PATENT DOCUMENTS

| 4,667,778 | 5/1987 | Ozaki | 188/24.12 |
| 4,765,443 | 8/1988 | Cunningham | 188/24.21 |
| 5,152,377 | 10/1992 | Yoshigai | 188/24.21 |
| 5,277,277 | 1/1994 | Yoshigai | 188/24.19 |
| 5,505,105 | 4/1996 | Kuo | 188/24.19 |

Primary Examiner—Robert J. Oberleitner
Assistant Examiner—Chris Schwartz

[57] ABSTRACT

A brake mechanism includes a brake arm having an orifice formed in the bottom and having a pin secured to the upper portion. A brake shoe is secured to the brake arm for brake the wheel. A block is fixed to the bicycle and has a tube engaged through the orifice such that the brake arm may be rotated relative to the tube. A support is secured to the tube, and a spring rod has a lower portion secured to the support and has an upper portion engaged with the pin for biasing the brake shoe away from the wheel. The spring rod may be easily assembled.

3 Claims, 4 Drawing Sheets

BRAKE MECHANISM FOR BICYCLE

BACKGROUND OF THE INVENTION

1. Field of the Invention

The present invention relates to a brake, and more particularly to a brake mechanism for a bicycle.

2. Description of the Prior Art

Typical brake mechanisms for bicycles comprise a pair of brake arms having a lower portion pivotally coupled to the bicycle frame or the fork device of the bicycle at a pivot shaft and having an upper portion coupled to a brake cable so as to be actuated by the brake cable. The brake arms include a lower portion having a brake shoe secured thereto for engaging with the wheel rim so as to brake the wheel. In order that the brake shoes may be disengaged from the wheel rim when it is not required to brake the wheel, two coil springs are engaged on the pivot shafts and engaged with the brake arms for biasing the brake arms away from the wheel rim. However, normally, the coil springs are required to be engaged within the brake arms. It will be difficult to engage the coil springs in the brake arms. In addition, the manufacturing cost thereof is expensive.

The present invention has arisen to mitigate and/or obviate the afore-described disadvantages of the conventional brake mechanisms for bicycles.

SUMMARY OF THE INVENTION

The primary objective of the present invention is to provide a brake mechanism for a bicycle in which the spring rod can be easily assembled.

In accordance with one aspect of the invention, there is provided a brake mechanism for securing to a bicycle and for braking a wheel, the brake mechanism comprises a brake arm including a bottom portion having an orifice formed therein and including an upper portion having a pin element extended therefrom, the brake arm including a lower portion, a brake shoe secured to the lower portion of the brake arm and rotated in concert with the brake arm, a block including a tube engaged through the orifice so as to allow the brake arm to be rotated relative to the tube, means for securing the block to the bicycle, a support secured to the tube, and a spring rod including a lower portion secured to the support and including an upper portion for engaging with the pin and for biasing the brake shoe away from the wheel.

The block includes a projection and the support is engaged on the tube and includes a notch engaged with the projection so as to limit a rotational movement of the support relative to the tube. A ring is rotatably engaged on the pin for engaging with the spring rod.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
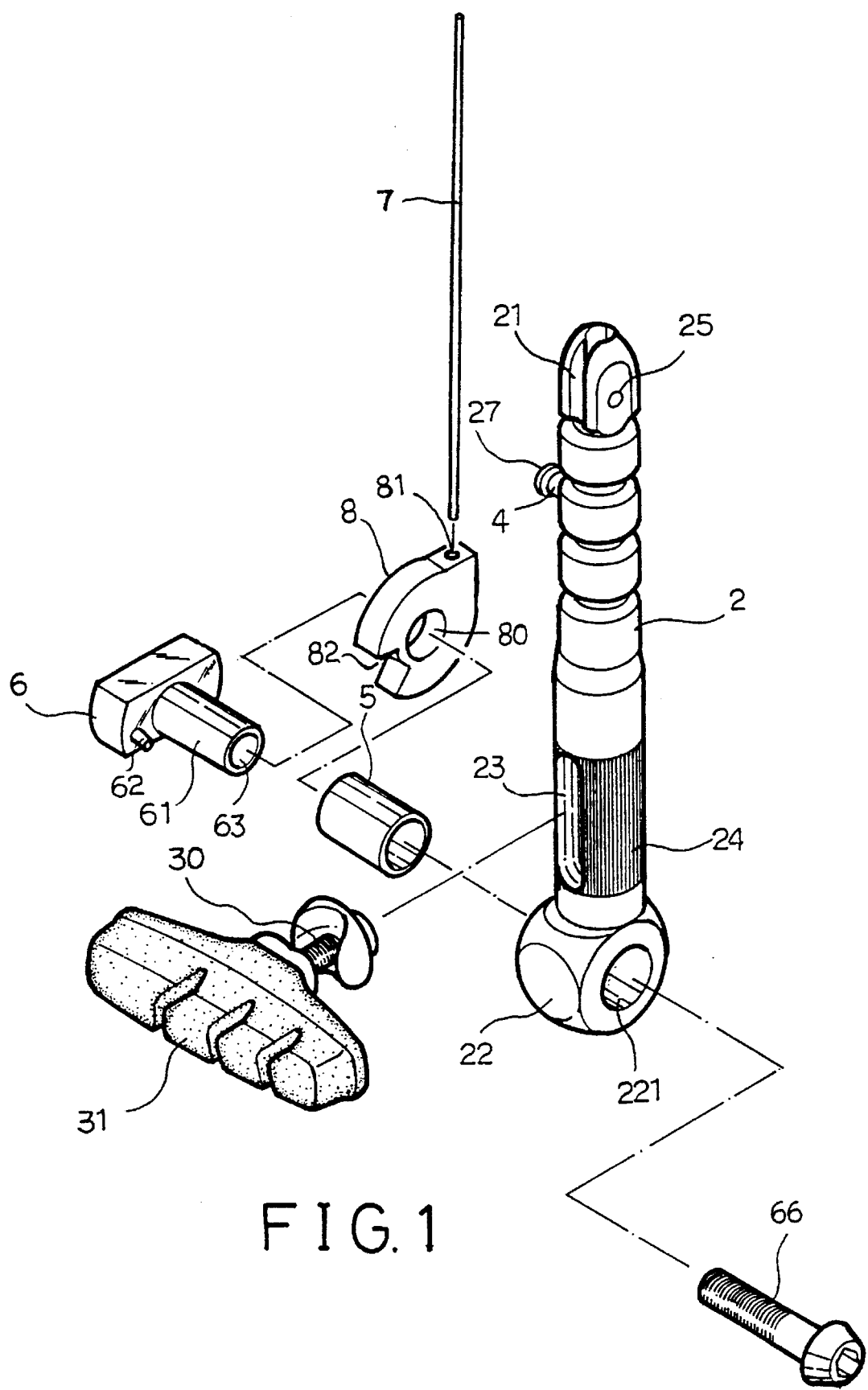
FIG. 1 is an exploded view of a brake mechanism for a bicycle in accordance with the present invention.
Figure 2:
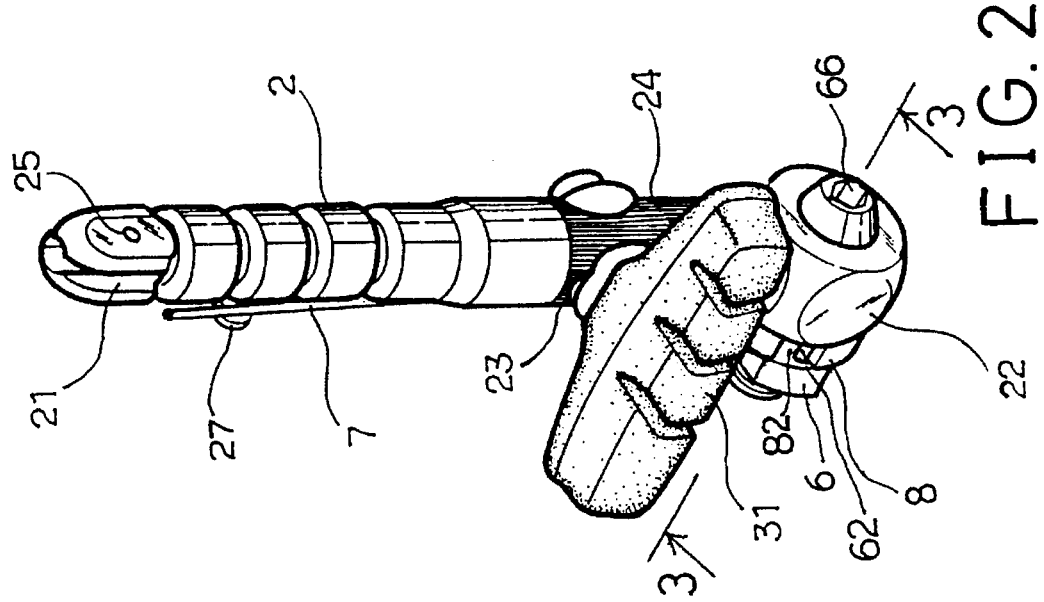
FIG. 2 is a perspective view of the brake mechanism for the bicycle.
Figure 3:
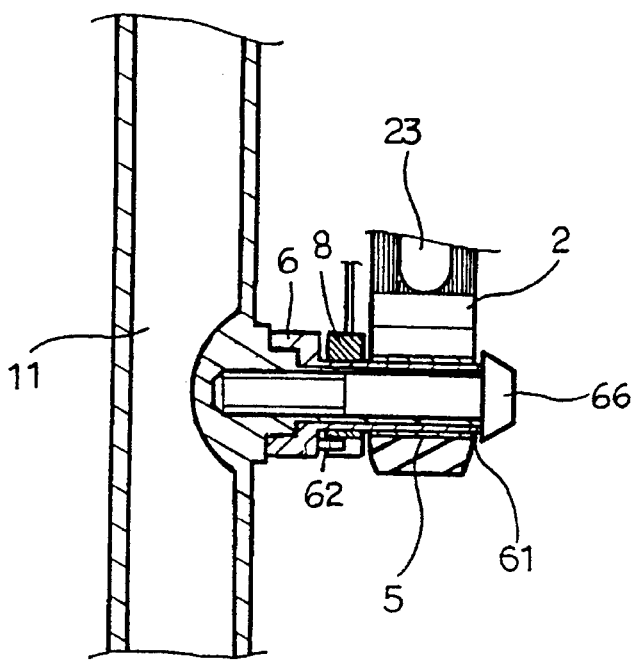
FIG. 3 is a cross sectional view taken along lines 3—3 of FIG. 2.

Referring to the drawings, and initially to FIGS. 1 to 3, a brake mechanism for a bicycle in accordance with the present invention comprises a pair of brake arms 2 each including a bottom portion 22 having an orifice 221 formed therein for engaging with a bushing 5 therein and each including a groove 21 formed in the tipper upper portion for engaging with the brake cable 12 (FIGS. 5 to 8). A hole 25 is formed in the upper portion of the brake arm 2 for engaging with a fastening screw so as to secure the brake cable 12 to the brake arm 2. An oblong hole 23 is formed in the lower portion of the brake arm 2 for engaging with a screw 30 therein and an embossment 24 is formed in the peripheral portion of the lower portion of the brake arm 2. The screw 30 is secured to a brake shoe 31 for securing the brake shoe 31 to the brake arm 2. The brake arm 2 includes a pin 27 secured to the upper portion and includes a ring 4 of rubber material rotatably engaged on the pin 27.

Figure 8:
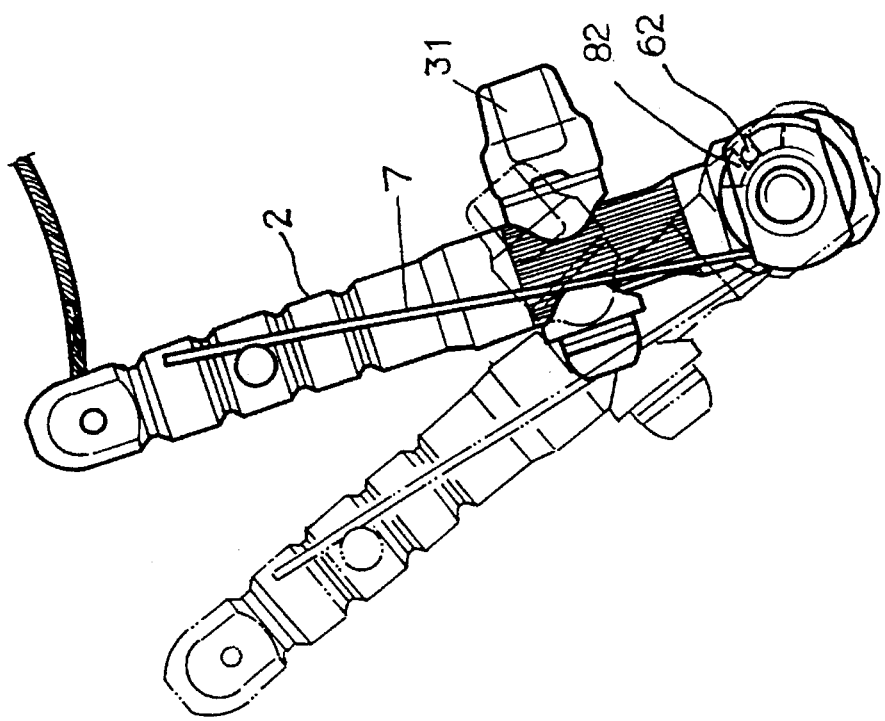
FIGS. 6, 7, 8 are plane views illustrating the operation of the brake mechanism.
Figure 4:
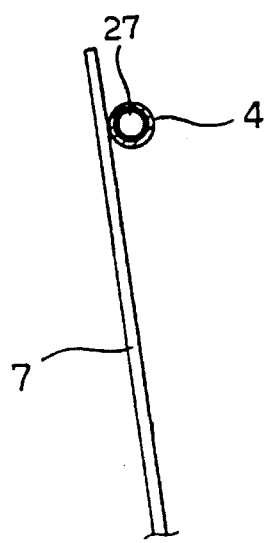
FIG. 4 is a schematic view illustrating the engagement of the spring with the brake arm.

A block 6 includes a tube 61 engaged through the bushing 5 and includes a bore 63 formed therein for engaging with a bolt 66 which may secure the block 6 and the tube 61 to the bicycle frame 11 (FIG. 3), especially the front fork or the rear fork. The block 6 includes a projection 62 extended therefrom. It is to be noted that the bolt 66 does not apply any force against the brake arm 2 such that the brake arm 2 may be freely rotated relative to the tube 61. A support 8 includes a hole 80 formed therein for rotatably engaging onto the tube 61 and includes a cavity 81 formed in the upper portion for securing a lower end of a spring rod 7. The spring rod 7 includes an upper portion engaged with the ring 4, best shown in FIG. 4, for biasing the brake arm 2 to rotate about the tube 61 and for biasing the brake shoe 31 away from the wheel rim of the wheel 1, best shown in FIG. 5. The support 8 includes a notch 82 engaged with the projection 62 so as to limit the rotational movement of the support 8 relative to the tube 61 (FIG. 8).

Figure 5:
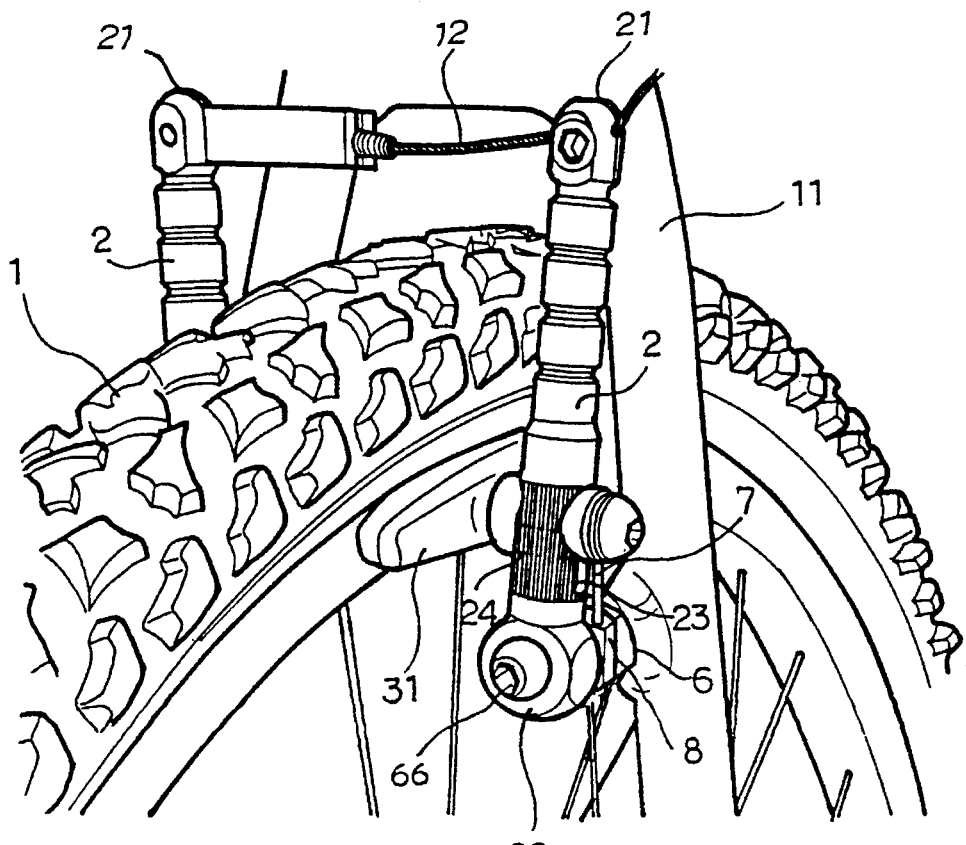
FIG. 5 is a perspective view illustrating the operation of the brake mechanism.
Figure 7:
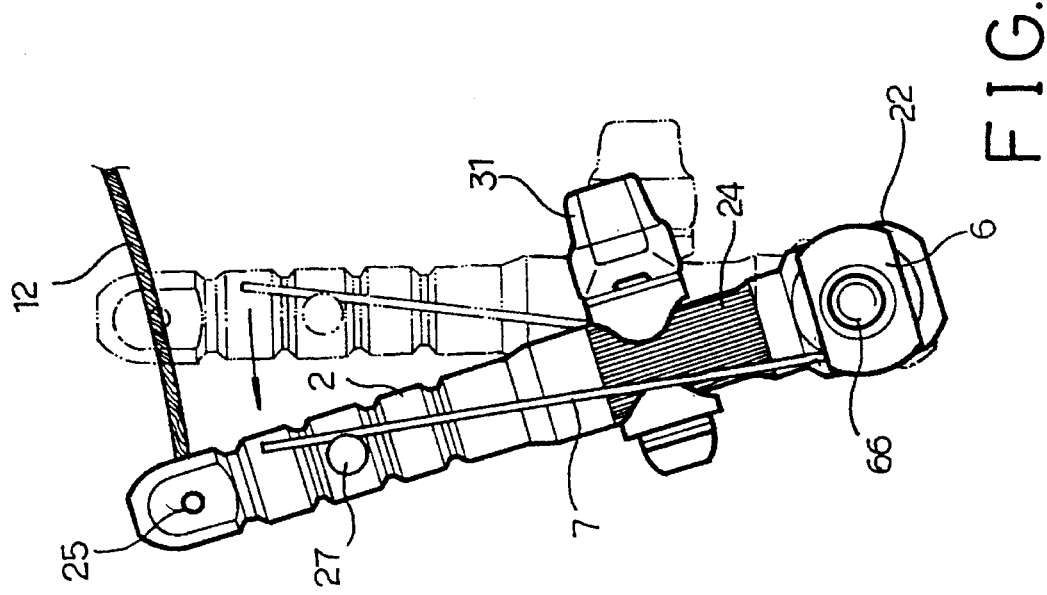
Figure 6:
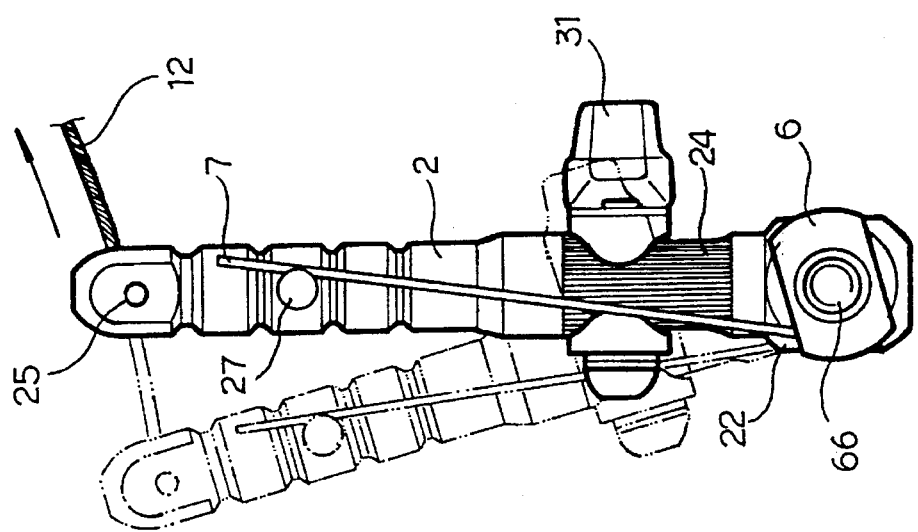

In operation, as shown in FIGS. 5 and 6, the upper portions of the brake arms 2 may be forced toward each other by the brake cable 12 so as to actuate the brake shoes 31 to engage with the wheel rim and so as to brake the wheel 1. When the brake cable 12 is no longer applying a force against the brake arms 2, as shown in FIG. 7, the spring rod 7 may bias the brake shoe 31 away from the wheel rim so as to disengage the brake shoe 31 from the wheel rim.

It is to be noted that the spring rod 7 can be easily secured to the support 8 with the lower end thereof. In addition, the upper end of the spring rod 7 may be easily engaged with the ring 4 by simply bending the spring rod 7 so as to allow the spring rod 7 to apply a force against the ring 4.

Accordingly, the brake mechanism in accordance with the present invention includes a configuration that may be easily assembled and includes a spring rod that may be easily engaged with the brake arm.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake mechanism for securement to a bicycle and for braking a wheel, said brake mechanism comprising:

a brake arm including a bottom portion having an orifice formed therein and including an upper portion having a pin element extended therefrom, said brake arm including a lower portion, a brake shoe secured to said lower portion of said brake arm and rotated in concert with said brake arm, a block including a tube engaged through said orifice so as to allow said brake arm to be rotated relative to said tube, means for securing said block to the bicycle, a support secured to said tube, and a spring rod including a lower portion secured to said support and including an upper portion for engaging with said pin and for biasing said brake shoe away from the wheel.

2. A brake mechanism according to claim 1, wherein said block includes a projection extended therefrom, said support includes a hole for rotatably engaging on said tube and includes a notch engaged with said projection so as to limit a rotational, movement of said support relative to said tube.

3. A brake mechanism according to claim 1 further comprising a ring rotatably engaged on said pin for engaging with said spring rod.

* * * * *

UNITED STATES PATENT AND TRADEMARK OFFICE
CERTIFICATE OF CORRECTION

PATENT NO. : 5562185
DATED : October 8, 1996
INVENTOR(S) : Chen

It is certified that error appears in the above-indentified patent and that said Letters Patent is hereby corrected as shown below:

On the title page, item [76] Inventor: "Box 63-69" should read -- Box 63-99 --.

Signed and Sealed this

Twenty-fifth Day of February, 1997

Attest:

BRUCE LEHMAN

*Attesting Officer*  *Commissioner of Patents and Trademarks*